US007088543B2

(12) United States Patent
Satoh et al.

(10) Patent No.: US 7,088,543 B2
(45) Date of Patent: Aug. 8, 2006

(54) SUSPENSION HAVING MAGNETIC HEAD ASSEMBLY MOUNTED THEREON AND MAGNETIC RECORDING DISK DRIVE USING THE SUSPENSION

(75) Inventors: Naoki Satoh, Fujisawa (JP); Masayuki Kurita, Fujisawa (JP); Mikio Tokuyama, Fujisawa (JP); Junguo Xu, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 331 days.

(21) Appl. No.: 10/676,677

(22) Filed: Sep. 30, 2003

(65) Prior Publication Data

US 2004/0114268 A1   Jun. 17, 2004

(30) Foreign Application Priority Data

Dec. 12, 2002   (JP)   ............................. 2002-361225

(51) Int. Cl.
*G11B 5/11* (2006.01)

(52) U.S. Cl. .................. 360/75; 360/234.5; 360/245.8; 360/246

(58) Field of Classification Search ............. 360/234.4, 360/234.5, 244.1, 245.8, 246
See application file for complete search history.

(56) References Cited

U.S. PATENT DOCUMENTS

| 6,181,520 B1* | 1/2001 | Fukuda .................... 360/244.1 |
| 6,256,172 B1* | 7/2001 | Griesbach .................. 360/246 |
| 6,317,280 B1* | 11/2001 | Nakajima et al. ............. 360/59 |
| 6,351,353 B1* | 2/2002 | Sluzewski et al. ....... 360/294.3 |
| 6,839,202 B1* | 1/2005 | Zhou ....................... 360/234.5 |
| 2002/0191326 A1* | 12/2002 | Xu et al. ...................... 360/75 |
| 2003/0099054 A1* | 5/2003 | Kamijima .................... 360/59 |
| 2004/0027709 A1* | 2/2004 | Hamaguchi et al. .......... 360/59 |
| 2004/0202066 A1* | 10/2004 | Yoshizawa et al. ...... 369/44.19 |

FOREIGN PATENT DOCUMENTS

| JP | 5020635 A | 1/1993 |
| JP | 11096608 A | 11/2001 |

* cited by examiner

*Primary Examiner*—K. Wong
*Assistant Examiner*—James L Habermehl
(74) *Attorney, Agent, or Firm*—Townsend and Townsend and Crew LLP

(57) ABSTRACT

A suspension having a magnetic head assembly 1 mounted thereon is provided, wherein the magnetic head assembly comprises: a write head 1-2; a read head 1-1; and a resistive heating element 1-3 for controlling the flying heights of the magnetic heads, wherein the wires HTx and GTx for the resistive heating element is disposed such that they sandwich the wires RxX and RxY for the read head. The wires for the resistive heating element may be disposed between the wires for the write head and the wires for the read head. Furthermore, the waveform of the current or voltage to the resistive heating element has a time constant of 1 μsec or more, the resistive heating element having wires disposed near the wires of the read head.

9 Claims, 11 Drawing Sheets

SUSPENSION HAVING MAGNETIC HEAD ASSEMBLY MOUNTED THEREON AND MAGNETIC RECORDING DISK DRIVE USING THE SUSPENSION

CROSS-REFERENCE TO RELATED APPLICATIONS

This application claims priority to Japanese application No. 2002-361225, filed Dec. 12, 2002, the entire disclosure of which is incorporated by reference for all purposes.

BACKGROUND OF THE INVENTION

The invention relates to controlling the flying height of a magnetic recording disk drive; and, more specifically, the invention relates to preventing a crosstalk against the read head.

Figure 13:
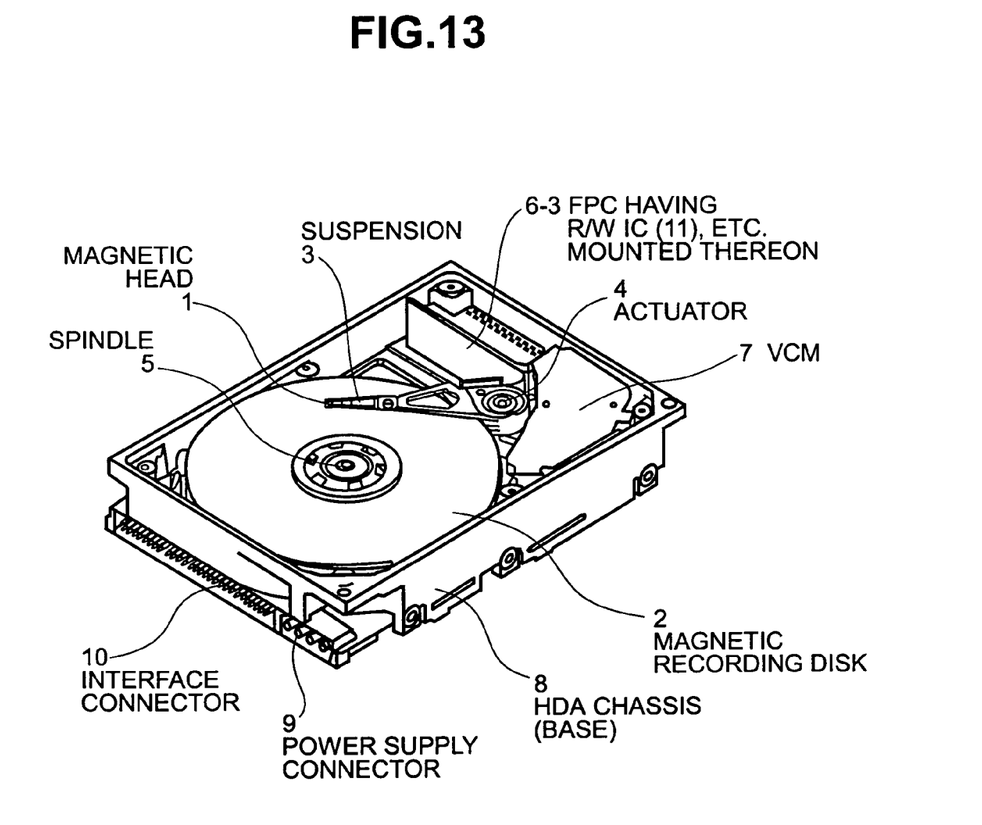
FIG. 13 is a diagram showing the configuration of the head/disk assembly of a prior art magnetic recording disk drive.

A conventional magnetic recording disk drive (hereinafter referred to as HDD) comprises a head/disk assembly that is a mechanical system, and a package substrate (PCB) made of circuits. FIG. 13 shows the configuration of a head/disk assembly (HDA) 100. The HDA 100 comprises components such as: a magnetic recording disk 2 installed in a chassis (base) 8 through a spindle 5; a magnetic head assembly 1 mounted on the tip of a suspension 3 connected with an actuator 4 driven by a voice coil motor (VCM) 7; a flexible printed cable (FPC) 6-3 having mounted thereon a read/write IC (R/W IC) 11 which electrically drives the magnetic head assembly 1. The actuator 4 moves the magnetic head assembly 1 so as to position it at an arbitrary location while the magnetic disk 2 is being rotated at a constant speed before the write/read operation begins.

Figure 14:
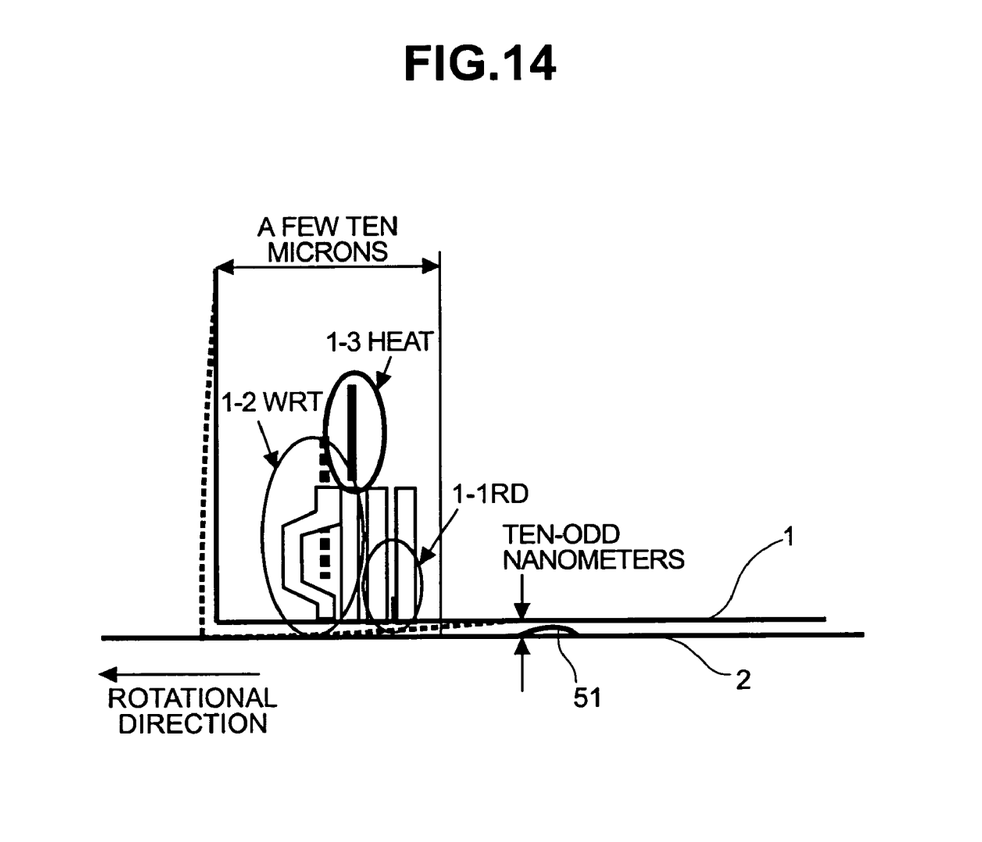
FIG. 14 is a diagram showing how a magnetic head having a resistive heating element is suspended above a magnetic recording disk in read/write operation.

FIG. 14 shows how the magnetic head assembly 1 is suspended above the magnetic recording disk 2 in a read/write operation. Due to increasing recording density of a magnetic recording disk drive, reduced flying hht of the magnetic head is required. With a reduced flying height, however, the write head element (WRT) 1-2 or the read head element (RD) 1-1 is likely to collide with a small bump 51 with a height of a few nanometers. These bumps are formed due to, for example, the surface roughness of the magnetic recording disk 2.

The flying height of the magnetic head assembly above the magnetic recording disk 2 is set to a small value, for example no more than 20 nm, in recent years. Assume that the small bump 51 has collided with the read head element (RD) 1-1. In such a case, if the RD 1-1 is a magnetoresistive head (hereinafter referred to as an MR head), the element produces heat and thereby an abnormal signal is generated by a thermal asperity (hereinafter referred to as TA) event. Such an incident results in a read abnormality. Further, when a high-frequency write current of a few hundred megahertz flows through the write head element (WRT) 1-2, the element produces heat and thereby the rear end of the magnetic head assembly projects toward the disk surface, as indicated by the broken lines in the figure. The higher the frequency of the high-frequency current, the larger the projection amount, reaching a few nanometers or more, due to the heat produced by the eddy current. With a reduced head flying height, a head element of the magnetic head assembly might be damaged if it protrudes.

Figure 15:
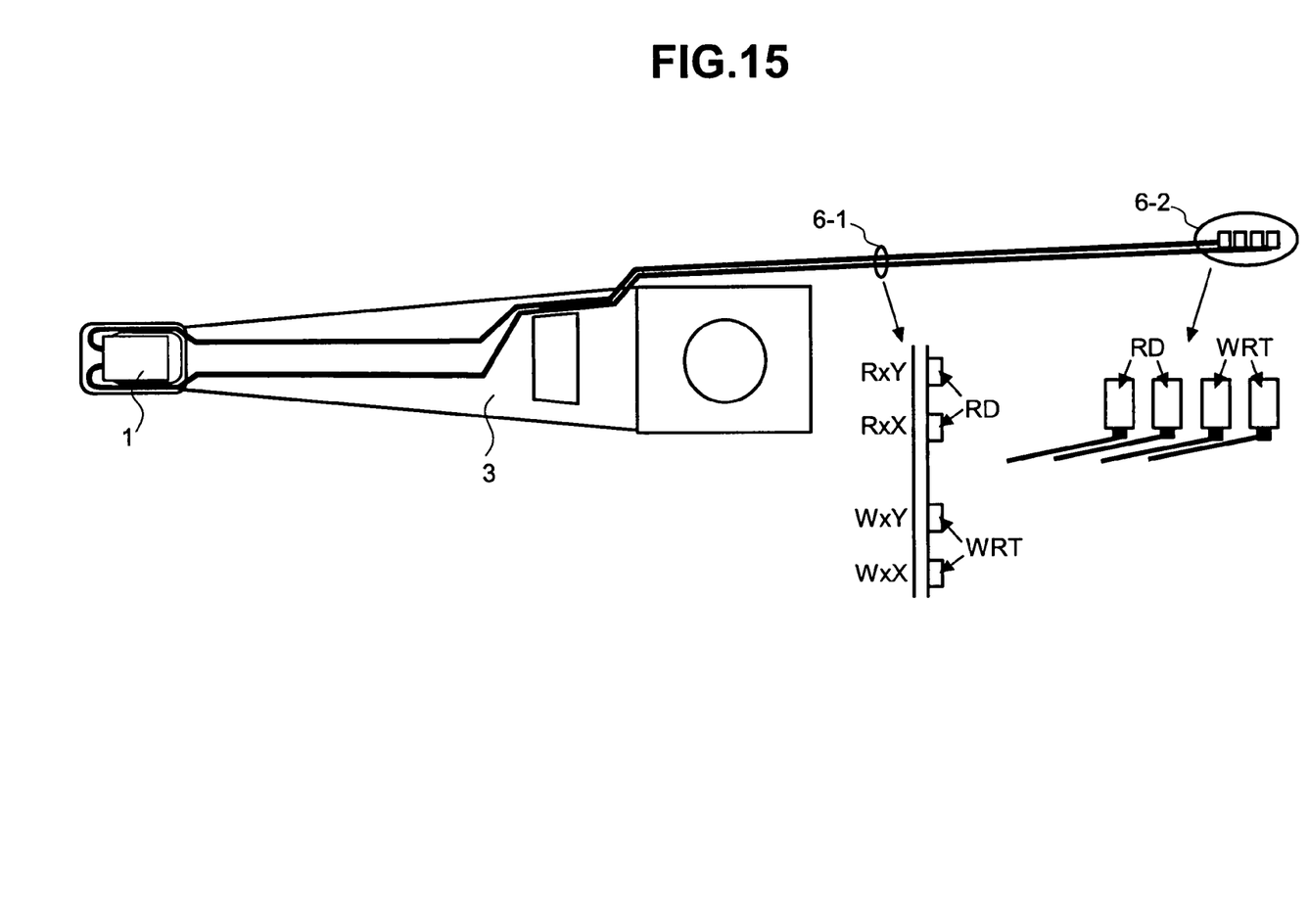
FIG. 15 is a diagram showing the wiring on the suspension for a prior art magnetic head.

FIG. 15 shows wiring (FPC) 6-1 on the suspension 3 for a magnetic head assembly implemented by a prior art that does not use a resistive heating element HEAT 1-3. A crosstalk current flows through wires RxX and RxY on the RD side due to the high-frequency current flowing through wires WxX and WxY on the WRT side and the flyback voltage in the write operation. The sense current supplied to the read head 1-1 is generally between 2 mA and 3 mA, and if the WRT side and the RD side are in close proximity, the crosstalk current might be as large or larger than the sense current. Since the read sensitivity increases with increasing sense current, the sense current is preferably set as large as possible within the allowable range. Further, at the same time, long life duration is required.

However, in case of a crosstalk, the value of the sense current must be reduced. Therefore, the wires on the WRT side are disposed away from the wires on the RD side to reduce the crosstalk current, and thereby increase the allowable value of the sense current. Also, an alternating current against the MR element of the read head, which is caused by the crosstalk current from the WRT side to the RD side leads to a reduction in the life duration of the MR element itself.

One technique used to solve the above problems is to install the resistive heating element HEAT 1-3 near a head element whose flying height has been increased beforehand, as shown in FIG. 14. With this arrangement, the protruding action of the head element due to heat from the resistive heating element HEAT 1-3 is rather utilized in order to control the flying height of the head element (see Japanese published application JPA 5-020635). There are various ways in which this resistive heating element is used. Generally, however, a current is passed through the resistive heating element in the read operation so as to reduce the flying height of the head element by using the heat produced by the resistive heating element. In the write operation, on the other hand, the current to the resistive heating element is basically cut off since due to the high-frequency write current flowing in the write operation, heat is already being produced, reducing the flying height. However, an appropriate amount of current may be applied in a low-temperature environment such as when the equipment is started. Alternatively, a low current may be applied all the time while adjusting its magnitude in order to provide some narrow flying height.

Another proposed prior art technique is to implement a magnetic head assembly which includes a heating magnetic head in addition to the write magnetic head and the read magnetic head (see Japanese published application JPA 11-096608). The technique disclosed in Japanese published application JPA 11-096608 increases the temperature of a recording portion of the recording medium to a value corresponding to the write or read temperature in the write or read operation by use of the heating magnetic head, making it possible to read from or write to narrowed tracks.

However, in Japanese published application JPA 5-020635, neither the detailed means nor the circuit configuration for controlling the amount of the generated heat is disclosed.

Furthermore, if new wiring is provided on the FPC 6-1 to supply power to the HEAT 1-3 in the prior art technique shown in FIG. 15, it may be necessary to reduce the distance between the wires WxX/WxY on the WRT side and the wires RxX/RxY on the RD side. This might result in an increase in the crosstalk current. Increased crosstalk current leads to reduction of the sense current to ensure adequate head life duration, which is not preferable. Further, the power supplied to the resistive heating element HEAT 1-3 is a maximum of a few ten milliwatts. Assuming that the resistance of the HEAT 1-3 is between some ten ohms through some hundred ohms, the current and the voltage amount to some ten milliamperes and a few volts, respectively. Therefore, if the current supplied to the HEAT 1-3 is switched on/off while data on a magnetic recording disk or a servo signal is being read, a large crosstalk current flows through the wires on the RD side, which can cause an abnormality in the read operation.

On the other hand, the heating magnetic head described in Japanese published application JPA 11-096608 is provided to increase the temperature of the recording media; it is not intended to control the flying height of the magnetic head. Furthermore, no consideration is given to the adverse effect of a crosstalk current against the read magnetic head, which is caused by switching the current on/off in the heating magnetic head, or by the high-frequency write current of the write magnetic head.

SUMMARY OF THE INVENTION

An embodiment of the present invention is directed to a magnetic head assembly which includes a resistive heating element for preventing the head element from colliding with small bumps on the magnetic recording disk surface (preventing the damage to the head element) and reducing TA (which stands for Thermal Asperity). Specifically, the embodiment is directed to providing a head element and wiring and/or power supply means to the resistive heating element which are designed to avoid the adverse effect of the crosstalk current and so on, to the read head. Further, the embodiment of the present invention is directed to providing a magnetic recording disk drive capable of properly performing read/write operation even when the internal temperature of the magnetic recording disk drive or the temperature of the surroundings change.

To solve the above problems, one embodiment of the present invention mainly implements the following configurations.

In the embodiment, a suspension having a magnetic head assembly mounted thereon is provided. The magnetic head assembly comprises: a write head for writing information to a recording medium; a read head for reading the information from the recording medium; and a resistive heating element for controlling flying heights of the write head and the read head; wherein in wiring from each terminal of the write head, the read head, and the resistive heating element to the suspension, wires of the resistive heating element are disposed such that they sandwich wires of the read head.

According to another aspect of the present invention, there is provided a suspension having a magnetic head assembly mounted thereon, the magnetic head assembly comprising: a write head for writing information to a recording medium; a read head for reading the information from the recording medium; and a resistive heating element for controlling flying heights of the write head and the read head; wherein in wiring from each terminal of the write head, the read head, and the resistive heating element to the suspension, wires of the resistive heating element are disposed between wires of the write head and wires of the read head.

According to still another aspect of the present invention, there is provided a suspension having a magnetic head assembly mounted thereon, the magnetic head assembly comprising: a write head for writing information to a recording medium; a read head for reading the information from the recording medium; and a resistive heating element for controlling to the resistive heating element has a time constant of 1 µsec or more, the resistive heating element having wires disposed near wires of the read head.

With these arrangements, it is possible to avoid the adverse effect of a crosstalk current, etc. on the read head.

The following table includes a description of reference numerals.

| | |
|---|---|
| 1 | magnetic head assembly |
| 1-1 | read head (RD) |
| 1-2 | write head (WRT) |
| 1-3 | resistive heating element (HEAT) |
| 2 | magnetic recording disk |
| 3 | suspension |
| 4 | actuator |
| 5 | spindle |
| 6-1 | wiring on suspension |
| 7 | voice coil motor (VCM) |
| 8 | chassis (base) |
| 10 | interface connector to host apparatus |
| 11 | read/write amplifier (R/W IC) |
| 12 | intermediate connector |
| 13 | servo signal area |

-continued

| | | |
|---|---|---|
| 20 | serial port (Reg_R/W) for R/W IC | |
| 21 | recording control signal (RD/WRT) of R/W IC | |
| 22 | output (read) differential signal (RDX/Y) | |
| 23 | input (write) differential signal (WDX/Y) | |
| 24 | positive source (VCC) | |
| 25 | GND terminal | |
| 26 | negative source (VEE) | |
| 28 | voltage/current of resistive heating element (Vhx/Ihx) | |
| 29 | voltage/current supply circuit (HDV) for resistive heating element | |
| 31 | random access memory (RAM) | |
| 32 | hard disk controller (HDC) | |
| 33 | digital signal processor (DSP) | |
| 34 | microprocessor (MPU) | |
| 37 | buffer RAM (BRAM) | |
| 38 | read channel IC (RDC) | |
| 40 | nonvolatile solid-state memory (FROM) | |
| 50 | head select control signal (HD_SEL) within R/W IC | |
| 51 | small bump on magnetic recording disk | |
| 52 | capacitor (Chx) | |
| 53 | data read control (Data RD) | |
| 100 | head/disk assembly (HDA) | |
| 200 | package board (PCB) | |
| 300 | host apparatus | |

DESCRIPTION OF ILLUSTRATIVE EMBODIMENTS

Description will be made below of devices for controlling the flying height of a magnetic head according to preferred embodiments of the present invention with reference to FIGS. 1 to 12. First of all, general description will be made of a magnetic recording disk drive which implements a technique for controlling the flying height of a magnetic head according to an embodiment of the present invention with reference to FIG. 12. The magnetic recording disk drive (HDD) comprises a head/disk assembly (HDA) 100 and a package board (PCB) 200, and is connected to a host apparatus 300.

Figure 12:
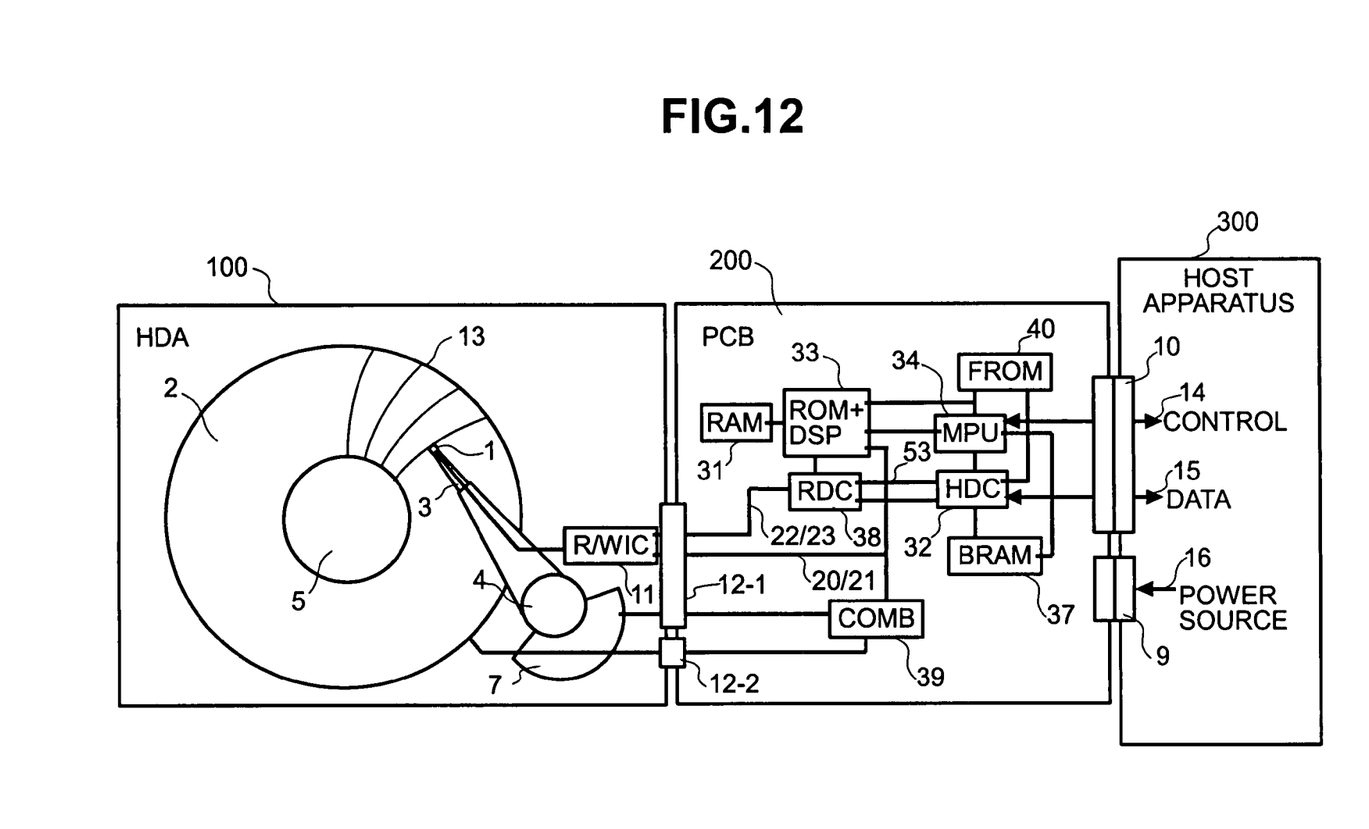
FIG. 12 is a diagram showing the entire circuit configuration of a magnetic recording disk drive according to an embodiment of the present invention.

General servo control operation is described with reference to FIG. 12. A signal read from a servo signal area 13 by the magnetic head element within the HDA 100 is amplified by a read/write amplifier (R/W IC) 11 before it is subjected to servo demodulation by the servo demodulation circuit of a read channel IC (RDC) 38 on the PCB 200 for servo demodulation and data read/write signal processing. Based on the demodulation results, a digital signal processor (DSP) 33 determines the position of the magnetic head assembly and reports it to a microprocessor (MPU) 34. The DSP 33 precisely controls the rotation of the motor (not shown) through a combination driver (COMB) 39 and also controls the current in a voice coil motor (VCM) 7 of an actuator 4 based on an instruction from the MPU 34 so as to control a seek operation between tracks of a magnetic recording disk 2 or a track following operation.

Next, general data read/write control operation is described. The MPU 34 issues an instruction to the DSP 33 and a hard disk controller (HDC) 32 based on control (information) 14 supplied from the host apparatus 300. After the DSP 33 has positioned the magnetic head assembly at a location in the recording area (readable/writable area) in the above described manner based on the issued instruction, the HDC 32 instructs the RDC 38 and the R/W IC 11 to perform read/write control in a sequence stored in a nonvolatile solid-state memory (FROM) 40. In the write operation, the HDC sends the value (user data 15) stored in a buffer RAM (BRAM) 37 to the RDC 38 after adding error correction code (ECC), etc. to it. The RCD 38 performs write signal processing to output serial data to R/W IC 11. The R/W IC 11 converts the data into a write current which is then converted to a write magnetic field by the magnetic head element so as to write the data in a predetermined data area of the magnetic recording disk 2. In the read operation, the R/W IC 11 amplifies a magnetization signal read by the magnetic head element at a predetermined location. The RDC 38 demodulates the magnetization signal into digital data which is then checked by the HDC 32 to determine whether it contains an error. If it does, the HDC 32 corrects the error before storing the data in the BRAM 32, and reports it to the host apparatus 300.

Figure 1:
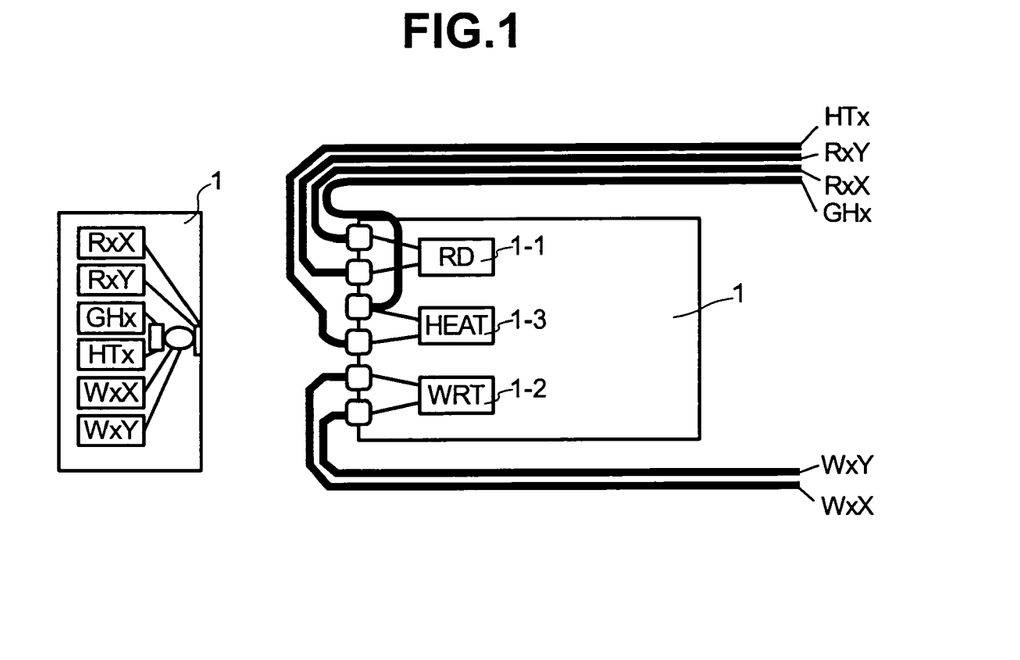
FIG. 1 is a diagram showing an example of the terminal arrangement of a magnetic head assembly according to a first embodiment of the present invention.
Figure 2:
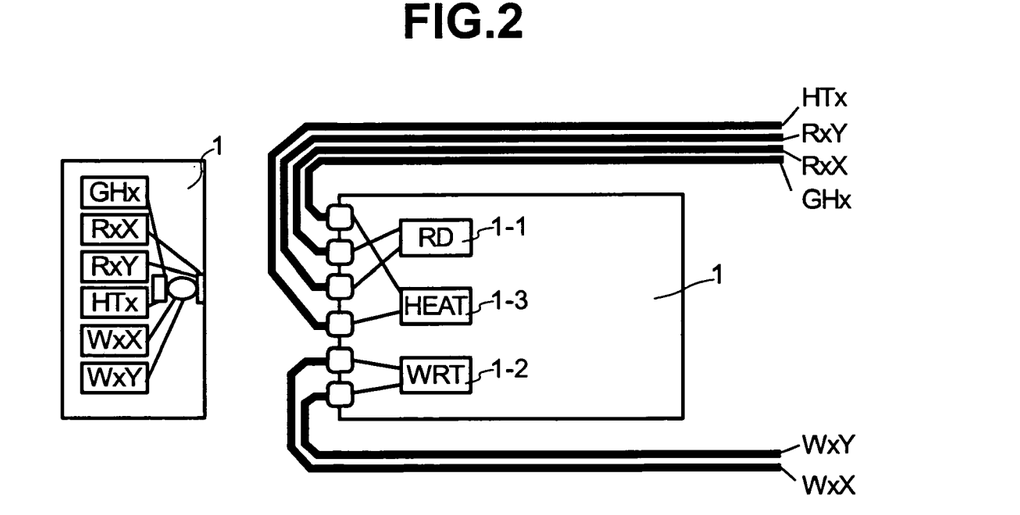
FIG. 2 is a diagram showing another example of the terminal arrangement of the magnetic head assembly according the first embodiment of the present invention.

Description will be made below of a specific configuration of a device for controlling the flying height of a magnetic head according to a first embodiment of the present invention with reference to the accompanying drawings. FIG. 1 is a diagram showing an example of the terminal arrangement of a magnetic head assembly according to the first embodiment of the present invention, while FIG. 2 is a diagram showing another example of the terminal arrangement of the magnetic head assembly according to the first embodiment of the present invention.

As used in this specification and the accompanying drawings, the term "magnetic head assembly 1" refers to a magnetic head assembly which comprises the read head (RD) 1-1, the write head (WRT) 1-2, and the resistive heating element (HEAT) 1-3; the term "head element" refers to the transducer for the read head 1-1 or the write head 1-2; and the term "magnetic head" refers collectively to the read head 1-1 and the write head 1-2. It should be noted that the magnetic head assembly 1 is not configured as an assembly unit. The magnetic head assemblies shown in FIGS. 13 to 15 and those generally used in a head/disk assembly (HDA) are examples of the magnetic head assembly 1.

Figure 11:
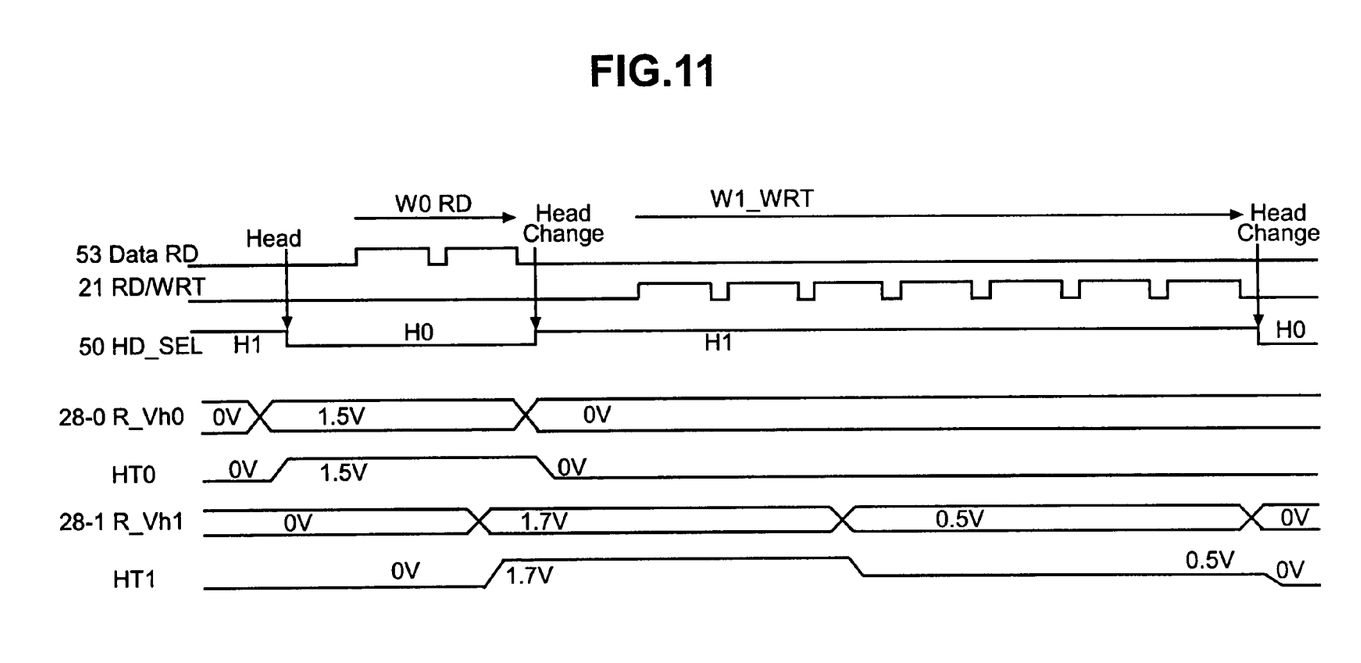
FIG. 11 is a diagram showing a control procedure in read/write operations according to an embodiment of the present invention.

FIG. 1 shows how each terminal of the magnetic head assembly is "extracted", and the arrangement of the wires in the wiring (FPC) 6-1 on the suspension. Reference numeral RD 1-1 denotes a read head which uses a thin-film magnetoresistive element as its head element, while reference numeral WRT 1-2 denotes a wire-wound write head which uses a thin film of a magnetic material and a thin-film conductor as its magnetic core and coil, respectively. Furthermore, a resistive heating element (HEAT) 1-3 of approximately 100 ohms is provided in the magnetic head assembly 1 to control the flying height. One way of using the resistive heating element is to supply a current of appropriate magnitude to the resistive heating element in the read operation to reduce the (head) flying height and thereby improve the read sensitivity for high density recording. A current of appropriate magnitude may also be supplied to the resistive heating element in the write operation to reduce the flying height. FIG. 11, described later, shows how to supply a current to the resistive heating element in both the read and the write operations.

The power terminals (HTx and GHx) for the HEAT 1-3 are provided on the central part of the rear end face of the magnetic head assembly 1. The wire to be connected to the GHx terminal is disposed on the "magnetic head assembly 1" side such that the wires to the terminals HTx and GHx sandwich the wires RxX and RxY for the RD. As a result, there are 4 wires on the RD side and 2 wires on the WRT side.

In FIG. 2, the terminal arrangement of the magnetic head assembly 1 is changed such that the wire to the GHx terminal of the HEAT 1-3 need not be disposed on the "magnetic head assembly 1" side. Specifically, the head terminals for the HEAT themselves sandwich the head terminals for the RD.

Both configurations shown in FIGS. 1 and 2 implement the same wire arrangement for the wiring (FPC) 6-1 on the suspension except for the portion of the wiring near the magnetic head assembly 1; the (wires) HTx and GHx are disposed such that they sandwich the wires RxX and RxY for the RD. Furthermore, the wires for the RD are disposed away from the wires for the WRT, making it possible to prevent occurrence of crosstalk from the WRT wiring to the RD wiring (if the crosstalk occurs, a crosstalk current flows through the MR element from the WRT wiring to the RD wiring, which leads to a reduction in the life of the MR element).

Figure 5:
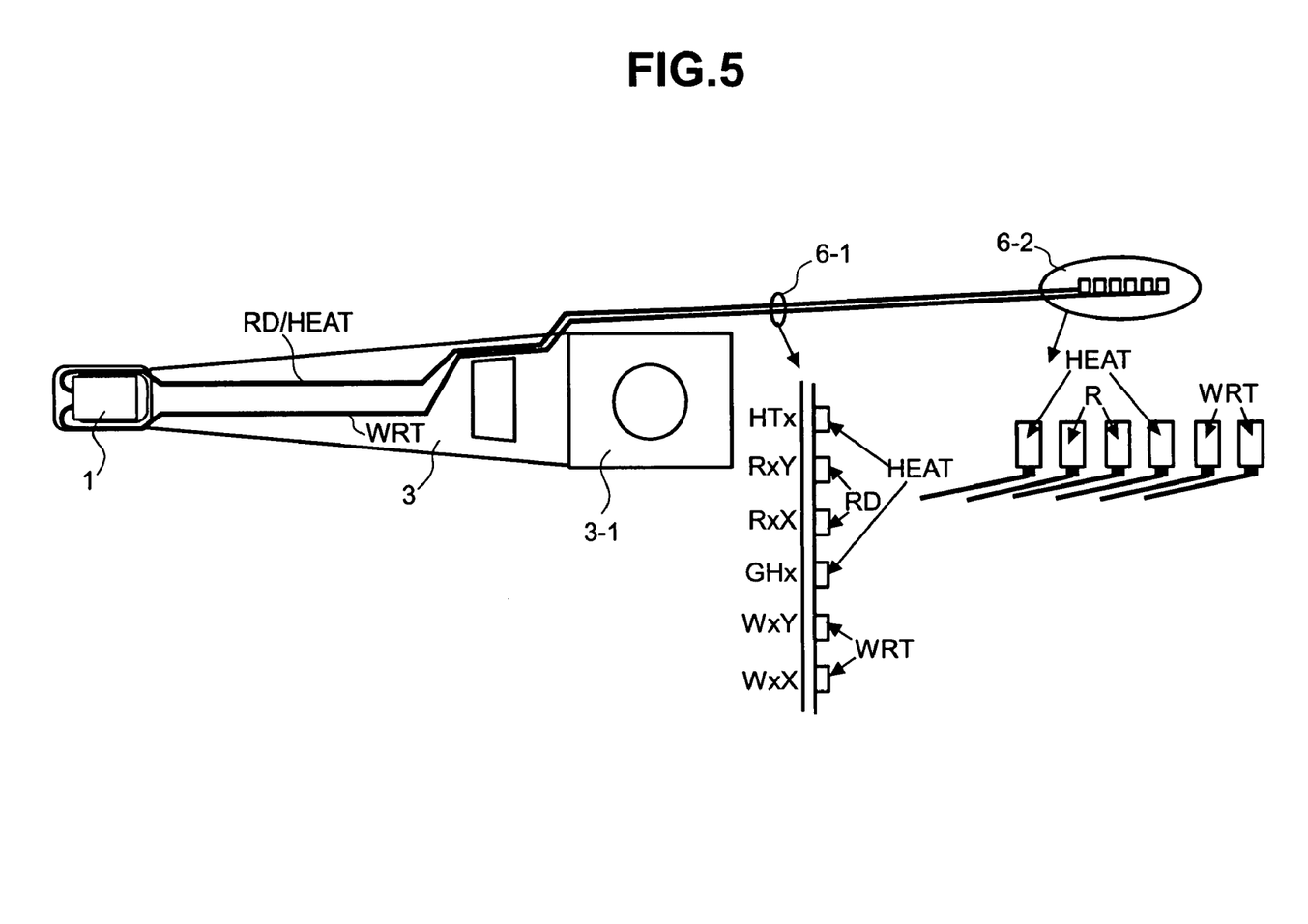
FIG. 5 is a diagram showing the wiring on a suspension according to the first embodiment of the present invention.

FIG. 5 shows the wiring (FPC) 6-1 on the suspension. The wiring from the magnetic head assembly 1 takes two routes, the RD/HEAT route and the WRT route, on the suspension 3. They are put together into a single route at a position near the fixed arm end 3-1 of the suspension 3 and further extended to a terminal 6-2. The arrangement of the wires in the wiring 6-1 shown in the cross-sectional view of FIG. 5 is the same as those shown in FIGS. 1 and 2 and can be implemented by a single-layer flexible wiring cable (FPC).

As shown in detail in FIG. 5, the wire GHx for the HEAT is laid between the wire WxY for the WRT and the wire RxX for the RD and thereby functions as a shield. This arrangement considerably reduces the influence on the wires RxX and RxY of a flyback generated on the wires WxX and WxY in the write operation. Since substantially no crosstalk current flows to the RD, it is possible to increase the sense current, thereby enhancing the sensitivity. Thus, the wires for the HEAT sandwich the wires for the RD, setting the wires for the RD away from the wires for the WRT.

Figure 7:
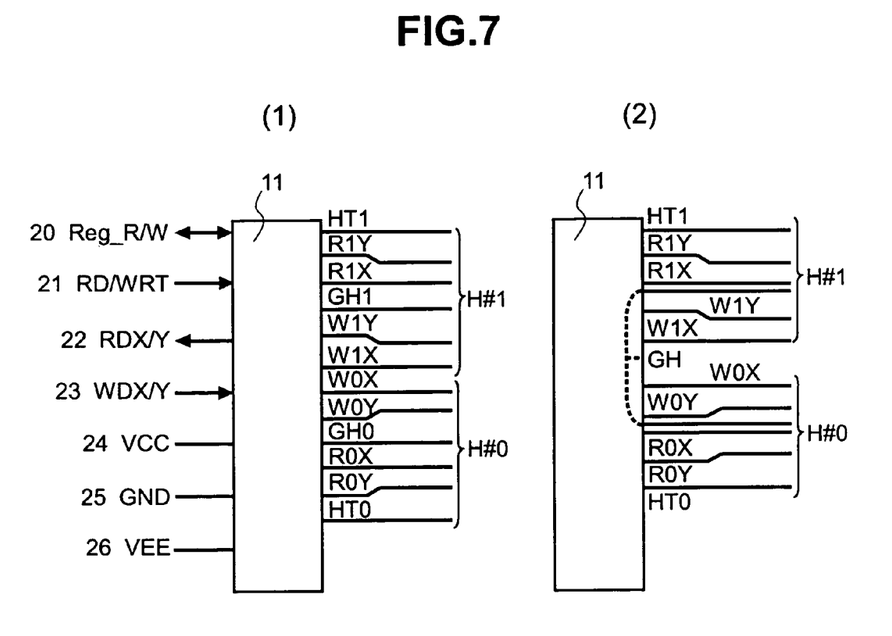
FIG. 7 (which includes FIGS. 7(1) and 7(2)) is a diagram showing examples of the terminal arrangement of a read/write amplifier according to the first embodiment of the present invention.

FIG. 7 (which includes FIGS. 7(1) and 7(2)) is a diagram showing examples of the terminal arrangement of a read/write amplifier according to the first embodiment of the present invention. FIG. 7(1) shows the control signals Reg_R/W and RD/WRT, the input/output (read/write) differential signals RDX/Y and WDX/Y, the magnetic head drive terminals RxX/Y, WxX/Y, and HTx/GHx, and the sources VCC, GND, and VEE of a read/write amplifier R/W IC 11. Referring to FIG. 12, the terminal arrangement on the right in FIG. 7(1) is connected to the magnetic head assembly, while that on the left is connected to the PCB.

The example of the R/W IC 11 shown in FIG. 7 handles two magnetic heads (H#0, H#1). However, the present embodiment can be applied to a read/write amplifier handling a larger number of heads such as 4 heads or 8 heads, or even 10 heads. Reference numeral Reg_R/W 20 denotes a serial port which is directly connected to an internal register and controlled by the DSP 33 and the RDC 38 shown in FIG. 12. The serial port is made of general control lines such as SDEN, SCLK, and SDATA, and selects each magnetic head using a select signal HD_SEL 50 (see FIG. 11 described later) and controls the write and the sense currents of each head and the current/voltage, etc. of the HEAT 1-3 for each head through internal registers.

FIG. 7(2) shows an example of the R/W IC 11 of IC package type implementing a reduced number of pins. The (terminals) GH0 and GH1 shown in FIG. 7(1) are replaced by a single (terminal) GH. Wiring wires on the undersurface of the R/W IC 11 as indicated by the broken line in the figure realizes the arrangement of the magnetic head drive terminals shown in FIG. 7(1) only using a single-layer FPC. For 4-head and 8-head R/W ICs 11, all of the 4 terminals GH0 to GH3 may be replaced by a single terminal.

Figure 9:
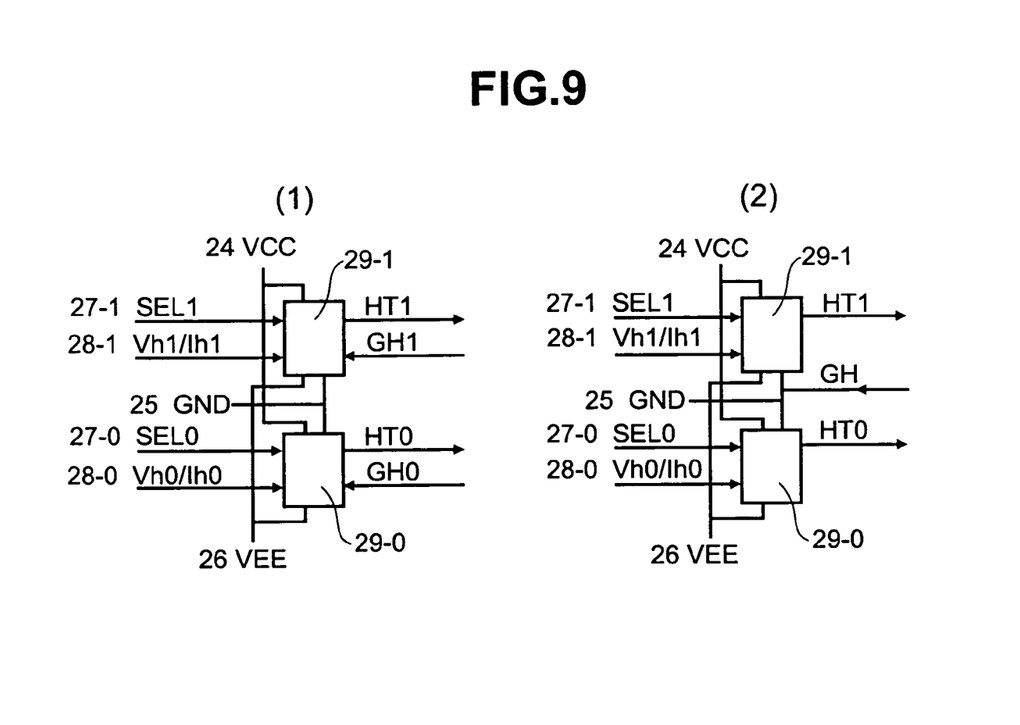
FIG. 9 (which includes FIGS. 9(1) and 9(2)) is a diagram showing examples of the input/output arrangement of a voltage/current supply circuit for a HEAT (resistive heating element) incorporated in the read/write amplifier according to the first embodiment of the present invention.

FIG. 9 (which includes FIGS. 9(1) and 9(2)) shows examples of the input/output arrangements of a voltage/current supply circuit (HDV) 29 for the HEAT incorporated in the R/W IC 11. The HDV 29 can be implemented by a general programmable voltage source or current source. Whether the system is driven by a voltage source or current source may be determined beforehand and only one of the sources (circuits) may be implemented. Or alternatively, both sources (circuits) may be incorporated and it may be arranged such that the mode can be set by use of an internal register. The magnitude of the power to be supplied to the HEAT is approximately 50 mW or less. Therefore, assuming that the resistance of the heating element is 100 ohms, the voltage/current supply circuit can be implemented by a voltage source of between 0 V and 2.5 V or a current source of between 0 mA and 25 mA. A resolution of 3 or 4 bits (8 to 16 levels) is generally enough for setting the voltage/current. With the sources VCC, GND, and VEE connected to the circuits, an internal register incorporated in the R/W IC issues an SELx (signal) to independently turn on/off the HDV 29 for each head. At that time, the voltage/current values are controlled by the Vhx/Ihx (signals) sent from an internal register. In the example shown in FIG. 9(2), the GHx is replaced by a (single terminal) GH, as in FIG. 7(2).

Figure 10:
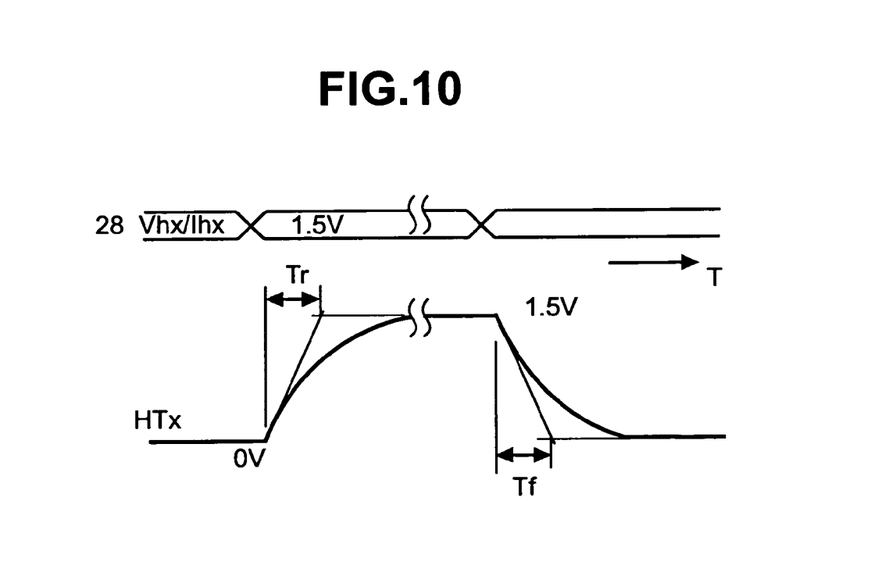
FIG. 10 is a diagram showing the waveform of the voltage or current supplied to a HEAT according to an embodiment of the present invention.

FIG. 10 shows the waveform of the voltage or the current supplied from the HDV 29 shown in FIGS. 9(1) and 9(2) to the HEAT. In the case of the voltage source, for example, if Vhx 28 is set to between 0 V and 1.5 V, the voltage supplied through the HTx terminal increases relatively gradually with a time constant Tr of 1 μsec or more (corresponding to a frequency of 150 kHz or less). Then, if Vhx 28 is set to 0 V, the voltage decreases relatively gradually to 0 V with a time constant Tf of 1 μsec or more. This arrangement can be easily implemented by a general programmable voltage source or current source and taking into account the CR change/discharge time constant. Furthermore, an active low-pass filter (LPF) having a cutoff frequency of approximately 150 kHz may be provided at the voltage/current output stage to obtain a similar output waveform, instead of implementing a programmable voltage source or current source.

Description will be made of the reason why the time constant is set to 1 μsec or more. The read band of the R/W IC 11 generally ranges from 500 kHz. Since 1 μsec corresponds to 150 kHz, a HEAT voltage waveform of 150 kHz, which is lower than the lower frequency limit 500 kHz of the read signal, does not adversely affect the read signal very much even in the read operation. Therefore, when an instantaneous crosstalk voltage/current is produced from the HEAT wiring to the RD wiring due to switching of voltage/current values to the HEAT during a data or servo signal read operation, the above means can be used to prevent its influence on the subsequent stages of the R/W IC 11. Certainly, it is more desirable to avoid switching voltage/current values of the HDV 29 during a data or servo signal read operation.

The voltage/current waveform in FIG. 10 described above is established based on the first embodiment in which the wires for the HEAT sandwich the wires for the RD. However, this waveform is not limited to the first embodiment. The voltage/current waveform shown in FIG. 10 is effective in any case where the HEAT wiring and the RD wiring coexist and a crosstalk current is produced from the HEAT wiring to the RD wiring. The adoption of this waveform itself constitutes an embodiment of the present invention.

FIG. 11 shows a procedure for controlling the HEAT in read/write operations. Description will be made of the control operation performed when the magnetic head H#1 carries out a write operation in a relatively short time after data is read with the magnetic head H#0.

The HD_SEL 50 (signal) issued from an internal register of the R/W IC 11 is currently set to "H#1" to indicate selection of the H#1. In this state, Vh0 (28-0) is set to 1.5 V and the value of HD_SEL 50 is changed to "H#0" 3 msec or more before the data read operation begins. After the magnetic recording disk has rotated to a desired read position, the HDC shown in FIG. 12 instructs the RDC 38 to perform data read control (Data RD 53). Then, Vh1 (28-1) is set to 1.7 V at some point during the above operation 3 msec or more before the data write operation with the H#1 begins. After the data read operation with the H#0 has been completed, the HD_SEL 50 is set to "H#1". After the magnetic recording disk has rotated to a desired write position, the information sent on the data WDX/Y (signal) from the RDC 38 is written under control of the DSP 33 using the RD/WRT 21 (signal).

At that time, if the write current is continuously supplied to the write head H#1, the flying height is further reduced due to the heat from the write head. Therefore, Vh1 (28-1) is set to 0.5 V at an appropriate timing to reduce the amount of heat generated in the HEAT so as to prevent the flying height from being excessively reduced. It should be noted that in the above arrangement, power is supplied to the HEAT for 3 msec or more before the read or write operation. However, since a different length of time may be more appropriate depending on the time constant ($\tau$h) for the heat distortion of the magnetic head, the position and shape of the heating element, and the materials of each component of the magnetic head, the length of time is preferably determined for each magnetic head type. It is arranged such that in the above operation, Vh0 and Vh1 can be driven at the same time. Thus, the above control method can compensate for the time constant for the heat distortion of the magnetic head.

Let Hfm denote the flying height margin to be provided (if the flying height does not exceed Hfm, there is a risk of the head element colliding with the disk). Then, determine, through tests of each magnetic head, (1) the relation between the flying height and the ambient temperature when no write operation is performed and no power is supplied to the HEAT (expressed as Hf(T)), and further determine (2) the amount of reduction of the flying height due to the write current of the write head (expressed as $\Delta$Hw (Iw)) and (3) the relation between the supply voltage to the HEAT and the amount of reduction of the flying height due to the heat from the HEAT (expressed as $\Delta$Hh(Vh)). Then, the relation $\Delta$Hh(Vh) may be controlled for each ambient temperature such that the following inequality holds.

$$Hf(T)-(\Delta Hw(Iw)+\Delta Hh(Vh))>Hfm$$

Strictly speaking, Hfm and $\Delta$Hw (Iw) may be replaced by Hfm(r) and $\Delta$Hw (Iw, fw), considering the dependence of the flying height on the magnetic recording disk radius r and the write frequency fw, respectively, which results in the following inequality.

$$Hf(T)-(\Delta Hw(Iw, fw)+\Delta Hh(Vh))>Hfm(r)$$

The timing at which the supply voltage (Vh) to the HEAT is switched from one value to another is set such that the switching operation is performed the time corresponding to the time constant for the heat distortion of the magnetic head ($\tau$h) or longer before the write or read operation is expected to begin. This arrangement makes it possible to perform read/write operation with an accurately compensated flying height.

Figure 3:
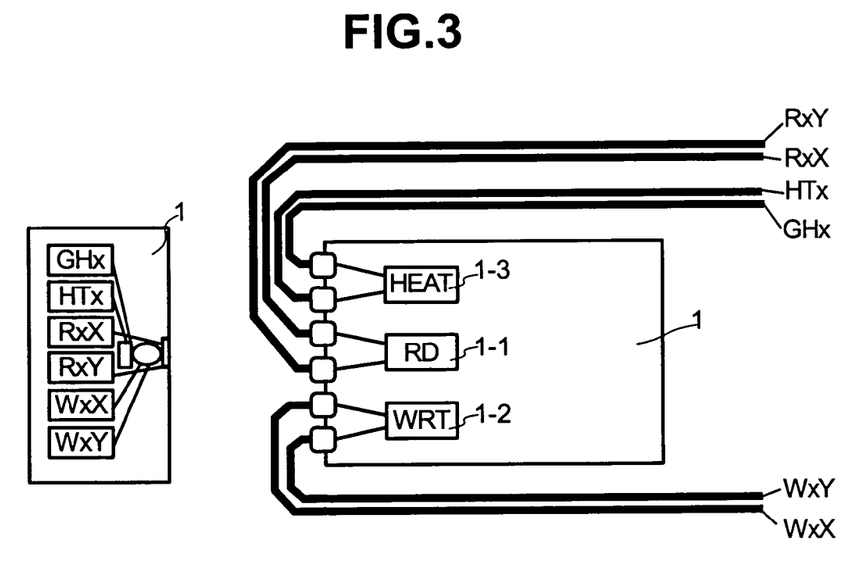
FIG. 3 is a diagram showing an example of the terminal arrangement of a magnetic head assembly according to a second embodiment of the present invention.
Figure 4:
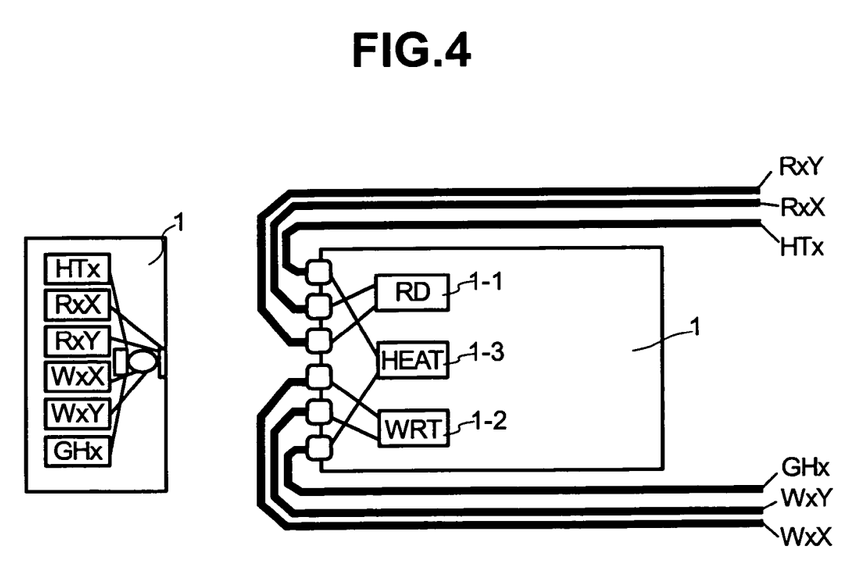
FIG. 4 is a diagram showing another example of the terminal arrangement of the magnetic head assembly according to the second embodiment of the present invention.

Description will be made below of a specific configuration of a device for controlling the flying height of a magnetic head according to a second embodiment of the present invention with reference to the accompanying drawings. FIG. 3 is a diagram showing an example of the terminal arrangement of a magnetic head assembly according to the second embodiment of the present invention, while FIG. 4 is a diagram showing another example of the terminal arrangement of the magnetic head assembly according to the second embodiment of the present invention. The second embodiment is different from the above first embodiment in the method for "extracting" each terminal of the magnetic head assembly, the arrangement of the wires on the suspension, and the pin arrangement and configuration of the read/write amplifier (R/W IC).

FIG. 3 shows how each terminal of the magnetic head assembly 1 is "extracted", and the arrangement of the wires in the wiring (FPC) 6-1 on the suspension. In the magnetic head assembly 1, reference numeral RD 1-1 denotes a read head which uses a thin-film magnetoresistive element as its head element, while reference numeral WRT 1-2 denotes a wire-wound write head which uses a thin film of a magnetic material and a thin-film conductor as its magnetic core and coil, respectively. A resistive heating element (HEAT) 1-3 of 100 ohms is provided to control the flying height. The power terminals (HTx and GHx) for the HEAT 1-3 are provided on a side part (not the central part) of the rear end face of the magnetic head assembly 1. There are 4 wires on the RD side including the wires for the HEAT, and 2 wires on the WRT side.

In FIG. 4, the terminals HTx and GHx for the HEAT 1-3 are each disposed on a respective side part of the magnetic head assembly 1. As a result, there are 3 wires on each of the RD side and the WRT side.

Both configurations shown in FIGS. 3 and 4 implement the same wire arrangement for the wiring (FPC) 6-1 on the suspension except for the portion of the wiring near the magnetic head assembly 1; the (wires) HTx and GHx for the HEAT are laid such that the wires RxX and RxY for the RD are disposed away from the wires WxX and WxY for the WRT. That is, the second embodiment shown in FIGS. 3 and 4 is different from the first embodiment in that the first embodiment sandwiches the wires for the RD between the wires for the HEAT whereas the second embodiment disposes the wires for the RD away from the wires for the WRT and lays the wires for the HEAT therebetween functioning as a shield.

Figure 6:
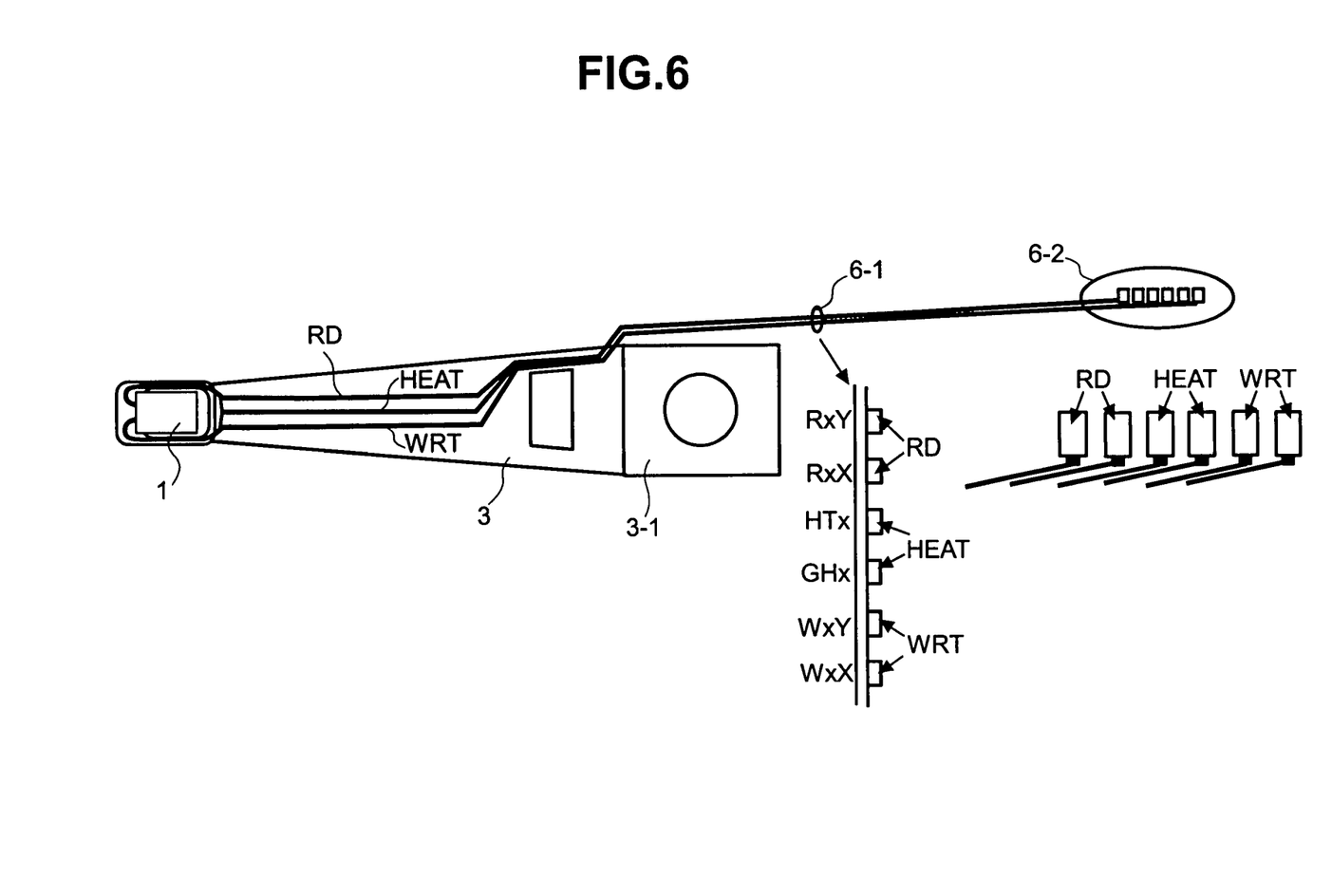
FIG. 6 is a diagram showing the wiring on a suspension according to the second embodiment of the present invention.

FIG. 6 shows the wiring (FPC) 6-1 on the suspension. The wiring from the magnetic head assembly 1 takes three routes, the RD, the HEAT, and the WRT routes, on the suspension 3. They are put together into a single route at a position near the fixed arm end 3-1 of the suspension 3 and further extended to a terminal 6-2. The arrangement of the wires in the wiring 6-1 shown in the cross-sectional view of FIG. 6 is the same as those shown in FIGS. 3 and 4 and can be implemented by a single-layer flexible wiring cable (FPC). As shown in FIG. 6, the two wires for the HEAT are laid between the wires for the WRT and the wires for the RD and function as a shield and increase the distance between the wires for the WRT and the wires for the RD. This arrangement reduces the influence on the wires RxX and RxY of the flyback generated on the wires WxX and WxY in the write operation much more than the first embodiment does. Since substantially no crosstalk current flows to the RD, it is possible to increase the sense current and thereby enhance the sensitivity.

Figure 8:
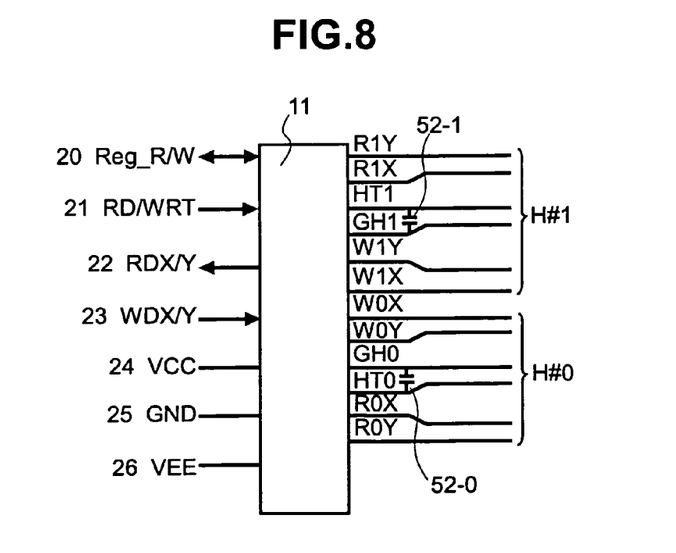
FIG. 8 is a diagram showing the terminal arrangement of a read/write amplifier according to the second embodiment of the present invention.

FIG. 8 shows the control signals Reg_R/W and RD/WRT, the input/output (read/write) differential signals RDX/Y and WDX/Y, the magnetic head drive terminals RxX/Y, WxX/Y, and HTx/GHx, and the sources VCC, GND and VEE of a read/write amplifier R/W IC 11. According to the second embodiment, a capacitor (Chx) 52 of a few nanofarads is provided between the HTx and the GHx to produce a time constant for the current of the HEAT shown in FIG. 10. Therefore, the HDV 29 within the R/W IC 11 shown in FIG. 9 need not provide any time constant. However, in the above case where the capacitor Chx is installed, the HEAT cannot be powered by voltage. Only a current control can be used. This is because the transient current flowing in the capacitor Chx cannot be controlled through a voltage control. Therefore, "Vh" in FIG. 11 must be replaced by "Ih" when the figure is applied to a control procedure for read/write operation according to the second embodiment.

As described above, the present invention relates to a magnetic head of a magnetic recording disk drive, wherein the magnetic head is made of a write head (WRT), a read head (RD), and a resistive heating element (HEAT). In connection with the magnetic head, the present invention provides the following configuration examples (first to fifth examples). According to a first example, the magnetic head has 6 terminals for the write head, the read head, and the resistive heating element, wherein the wires on the resistive heating element side are disposed such that they sandwich the wires on the read head side. This arrangement allows the wires on the resistive heating element side to prevent a crosstalk current from being induced from the wires on the write head side to the wires on the RD side in the write operation. Further, according to a second example, the wires on the resistive heating element side are disposed between the wires on the write head side and the wires on the read head side. This arrangement also allows the wires on the resistive heating element side to prevent a crosstalk current from being induced from the wires on the write head side to the wires on the RD side.

Still further, according to a third example, the read/write amplifier includes a programmable current source or voltage source for supplying power to the resistive heating element. This arrangement makes it possible to compensate for the variations in the flying height due to variations in the manufacturing process of the magnetic head, the ambient temperature, etc. by controlling the amount of heat generated in the resistive heating element. Still further, according to a fourth example, the programmable current source or voltage source of the third example switches between current values or voltage values with a time constant of 1 μsec or more. Still further, according to a fifth example, in the programmable current source or voltage source of the third example, a capacitor of a few nanofarads is provided across the output terminals of means for switching between stepwise current values. Furthermore, the present invention also relates to a method for controlling a magnetic recording disk drive. In this connection, the present invention provides the following configuration examples (sixth to eleventh examples). According to a sixth example, the current source or voltage source of the third example performs no switching operation during a data or servo signal read operation.

Further, a seventh example includes: means for, through tests of each magnetic head, determining and storing the relation between the flying height and the ambient temperature T when no write operation is performed and no power is supplied to the resistive heating element (expressed as Hf(T) in which the flying height margin to be provided is denoted by Hfm); means for storing the amount of reduction of the flying height due to the write current Iw of the write head (expressed as ΔHw (Iw)); means for storing the relation between the supply voltage to the resistive heating element and the amount of reduction of the flying height due to the heat from the resistive heating element (expressed as ΔHh (Vh)); and means for measuring the ambient temperature T; wherein the supply voltage Vh to the resistive heating element is controlled based on the ambient temperature T and the read/write conditions such that the following inequality holds: Hf(T)−(ΔHw(Iw)+ΔHh(Vh))>Hfm. Still further, according to an eighth example, Hfm and ΔHw (Iw) in the seventh example are replaced by Hfm(r) and ΔHw (Iw, fw), considering the dependence of the flying height on the magnetic recording disk radius r and the write frequency fw, wherein the supply voltage Vh to the resistive heating element is controlled based on the ambient temperature T and the read/write conditions such that the following inequality holds:

$$Hf(T)-(\Delta Hw(Iw, fw)+\Delta Hh(Vh))>Hfm(r).$$

Still further, according to a ninth example, the seventh or eighth example is further configured such that the supply of the current or voltage (Vh/Ih) to the resistive heating element is initiated the time corresponding to the time constant for the heat conductance of the magnetic head or longer before the read/write operation begins. Still further, according to a tenth example, the read/write amplifier includes a programmable current source or voltage source for supplying power to the resistive heating element of the magnetic head. Still further, according to an eleventh example, the tenth example is further configured such that the programmable current source or voltage source switches between current values or voltage values with a time constant of 1 μsec or more.

Furthermore, the present invention also relates to a suspension, providing the following configuration examples (twelfth and thirteenth examples). According to a twelfth example, the suspension has mounted thereon a magnetic head having 6 terminals for a write head, a read head, and a resistive heating element, wherein the wires on the resistive heating element side are disposed such that they sandwich the wires on the read head side. Further, according to a thirteenth example, the suspension has mounted thereon a magnetic head having 6 terminals for a write head, a read head, and a resistive heating element, wherein the wires on the resistive heating element side are disposed between the wires on the write head side and the wires on the read head side. Furthermore, according to a fourteenth example, the read/write amplifier for the magnetic recording disk drive in the tenth example is configured such that it can drive two or more programmable current sources or voltage sources at the same time.

The above-described preferred embodiment relates to a magnetic head assembly which includes a resistive heating element for preventing the head element from colliding with small bumps on the magnetic recording disk surface (preventing damage to the head element) and reducing TA. The present invention can avoid the adverse effect on the read head of the crosstalk current, etc. due to the high-frequency current of the write head or switching on/off of the current in the resistive heating element by: sandwiching the wires for the read head between the wires for the resistive heating element; disposing the wires for the resistive heating element between the wires for the read head and the wires for the write head; or configuring the power supply source to the resistive heating element such that it has an appropriate time constant.

Furthermore, the present invention provides a magnetic recording disk drive capable of properly performing read/write operation even when the internal temperature of the magnetic recording disk drive or an ambient temperature such as the outside air temperature changes.

What is claimed is:

1. A suspension having a magnetic head assembly mounted thereon, said magnetic head assembly comprising:
   a write head for writing information to a recording medium;
   a read head for reading said information from said recording medium; and
   a resistive heating element for controlling flying heights of said write head and said read head;
   wherein in wiring from each terminal of said write head, said read head, and said resistive heating element to said suspension, wires of said resistive heating element are disposed such that they sandwich wires of said read head.

2. The suspension of claim 1 wherein a waveform of a current or a voltage to said resistive heating element has a time constant of 1 μsec or more.

3. A suspension having a magnetic head assembly mounted thereon, said magnetic head assembly comprising:
   a write head for writing information to a recording medium;
   a read head for reading said information from said recording medium; and
   a resistive heating element for controlling flying heights of said write head and said read head;
   wherein in wiring from each terminal of said write head, said read head, and said resistive heating element to said suspension, wires of said resistive heating element are disposed between wires of said write head and wires of said read head.

4. The suspension of claim 3 wherein a waveform of a current or a voltage to said resistive heating element has a time constant of 1 μsec or more.

5. A suspension having a magnetic head assembly mounted thereon, said magnetic head assembly comprising:
   a write head for writing information to a recording medium;
   a read head for reading said information from said recording medium;
   a resistive heating element for controlling flying heights of said write head and said read head; and
   a programmable voltage or current source for supplying power to said resistive heating element to allow for variations in the power supplied to said resistive heating element to account for variations in the flying height due to variations in the manufacturing process of said write head and said read head,
   wherein a waveform of a current or a voltage to said resistive heating element has a time constant of 1 μsec or more.

6. A suspension having a magnetic head assembly mounted thereon, said magnetic head assembly comprising:
   a write head for writing information to a recording medium;
   a read head for reading said information from said recording medium;
   a resistive heating element for controlling flying heights of said write head and said read head; and
   a voltage or current source for supplying power to said resistive heating element;
   wherein in wiring from each terminal of said write head, said read head, and said resistive heating element to said suspension, wires of said resistive heating element are disposed to provide shielding of said read head.

7. The suspension of claim 6 wherein said voltage or current source is configured not to switch during a data or servo signal read operation.

8. A suspension having a magnetic head assembly mounted thereon, said magnetic head assembly comprising:
   a write head for writing information to a recording medium;
   a read head for reading said information from said recording medium;
   a resistive heating element for controlling flying heights of said write head and said read head; and
   a current or voltage source for supplying power to said resistive heating element, said current or voltage source providing a waveform having a time constant of 1 μsec or more.

9. The suspension of claim 8 wherein in wiring from each terminal of said write head, said read head, and said resistive heating element to said suspension, wires of said resistive heating element are disposed to provide shielding of said read head.

* * * * *